United States Patent [19]

Clark, deceased et al.

[11] Patent Number: 5,226,690
[45] Date of Patent: Jul. 13, 1993

[54] WHEEL FOR IRRIGATION SYSTEM

[75] Inventors: Goebel Clark, deceased, late of Texhoma, Okla., by Taylor E. Clark, administrator; Taylor E. Clark, R.R. #1, Box 105, Texhoma, Okla. 73949; Irwin E. Clark; Tom Stephens, both of Guymon, Okla.

[73] Assignee: Taylor E. Clark, Texhoma, Okla.

[21] Appl. No.: 888,965

[22] Filed: May 26, 1992

Related U.S. Application Data

[63] Continuation of Ser. No. 842,485, Feb. 27, 1992, abandoned, which is a continuation-in-part of Ser. No. 649,971, Feb. 4, 1991, abandoned.

[51] Int. Cl.5 ............................................. B60B 15/02
[52] U.S. Cl. ........................................ 301/43; 301/53
[58] Field of Search ..................... 301/43, 52, 53, 55, 301/57, 58, 59, 41.1, 44.3, 44.4, 36.1

[56] References Cited

U.S. PATENT DOCUMENTS

| | | | |
|---|---|---|---|
| 674,937 | 5/1901 | Mussetter | 301/53 X |
| 921,557 | 5/1909 | Mussetter | 301/53 X |
| 1,229,404 | 6/1917 | Bold . | |
| 1,317,908 | 10/1919 | Boker . | |
| 1,410,672 | 3/1922 | Graham . | |
| 1,492,850 | 5/1924 | Hubbard . | |
| 1,715,841 | 6/1929 | Johnson | 301/44 B X |
| 1,877,379 | 9/1932 | Ash | 301/55 |
| 2,106,135 | 1/1938 | Henry | 301/52 |
| 5,046,785 | 9/1991 | Bockerman | 301/52 |

FOREIGN PATENT DOCUMENTS

| | | | |
|---|---|---|---|
| 78083 | 1/1919 | Fed. Rep. of Germany | 301/43 |
| 2130978 | 6/1984 | United Kingdom . | |

Primary Examiner—Russell D. Stormer
Attorney, Agent, or Firm—Dougherty, Hessin, Beavers & Gilbert

[57] ABSTRACT

An irrigation wheel for movably supporting an irrigation pipe of a center pivot irrigation system, and including a central hub plate defining a central opening around the wheel axis of rotation. A pair of parallel, spaced annular rim plates of frustoconical configuration extend concentrically around the hub plate and wheel axis of rotation, and are fixed relative to the hub plate by circumferentially spaced spoke rods. The spoke rods are bent at their inner ends so as to define, in their overall configuration, an open space around the center of the wheel and extending out to the rim plates. The rim plates are unconnected to each other, except for the connection afforded by the spoke rods, which extend from the rim plates inwardly to the central hub plate and are connected to the central hub plate. Each rim plate has an inner edge, and has an outer edge which is spaced a greater radial distance from the wheel axis of rotation than is the inner edge.

5 Claims, 1 Drawing Sheet

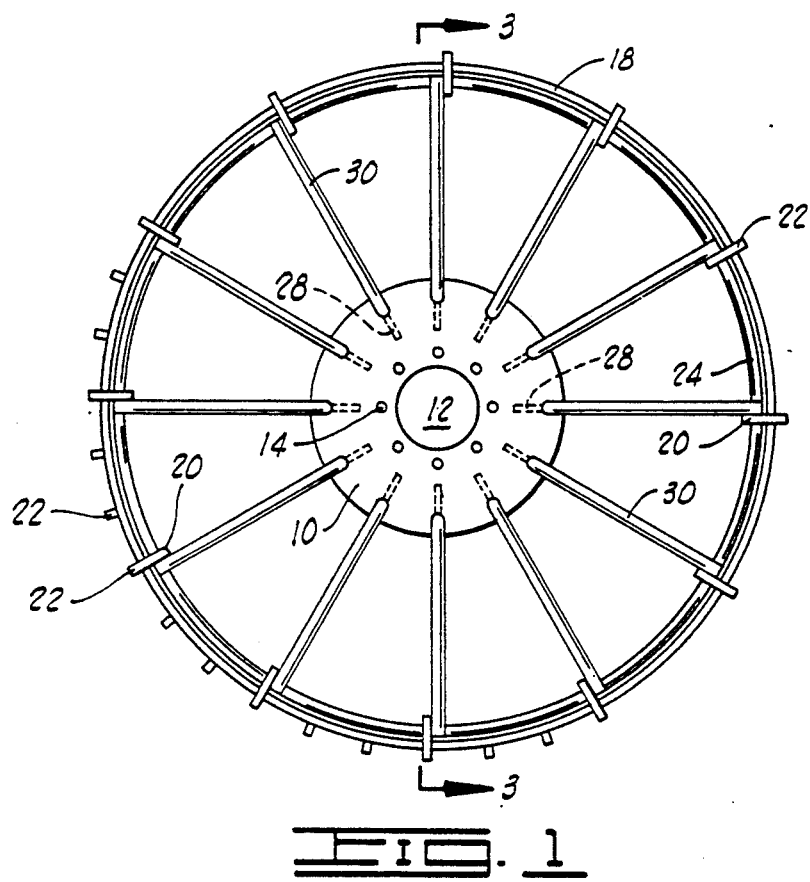
FIG. 1
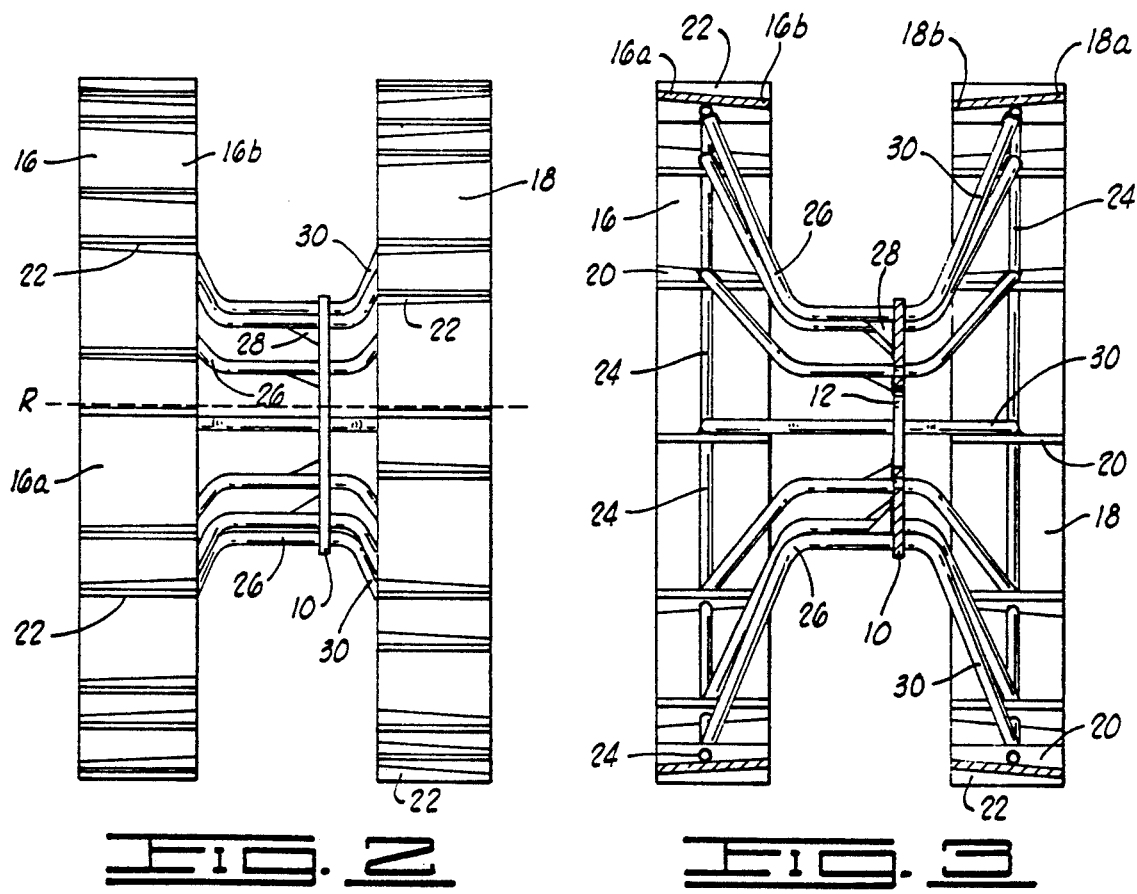
FIG. 2
FIG. 3

WHEEL FOR IRRIGATION SYSTEM

RELATED APPLICATION

This application is a continuation of our U.S. patent application Ser. No. 07/842,485, filed on Feb. 27, 1992, entitled "WHEEL FOR IRRIGATION SYSTEM (now abandoned), which is a continuation-in-part of U.S. patent application Ser. No. 07/649,971, filed on Feb. 4, 1991 and entitled "WHEEL FOR IRRIGATION SYSTEM" (now abandoned).

FIELD OF THE INVENTION

This invention relates to a large rigid wheel of the type used to support an open field center pivot irrigation system which includes elongated interconnected pipes carrying irrigation water over a large expanse of a field, and movable from one location to another by rotation of such wheels.

BACKGROUND OF THE INVENTION

Brief Description Of The Prior Art

Center pivot irrigation systems used for irrigating large cultivated areas in the Great Plains of the United States frequently include large pipes by which water for irrigation is piped extensive distances from a central source, with such pipes supported on large wheels which may be many feet in diameter. The site which is being irrigated is changed from time-to-time by pulling the system to a new location upon the supporting wheels as the wheels are rotated to accommodate the movement when the system is pulled to the new location by a tractor. The wheels are usually provided in pairs at spaced locations along the irrigation pipe called towers.

The weight supported by each wheel is great with the result that frequently there is a marked propensity for the wheel to sink deeply into the earth, and to make ruts of considerable depth as it is undergoing movement from on location to the other. This presents an obstacle to the movement of personnel and vehicles across the field so rutted. Accordingly, some effort has been made to construct irrigation wheels of the type described which better support the weight imposed upon them, and resist being forced to a significant depth in the earth by such weight.

One such irrigation wheel is sold under the trade name "E-Z Trak" by Caldwell Manufacturing Company of Kerney, Nebr. The "E-Z Trak" irrigation wheel includes a pair of outer rim plates which contact the ground and support the wheel thereon. These rims are spaced from each other, and are angled so that they actually each constitute a frustum of a cone. Stated differently, the inner peripheral edge of each annular rim in the "E-Z Trak" wheel is located more closely to the axis of rotation of the wheel than is the outer edge of each of the rims. Stated yet another way, each rim plate slopes radially inwardly from its outer edge to the central plane of the wheel and to the two inner edges of the two rim plates which face each other across an intervening gap or space which separates the two rims. The rim plates as thus configured and located are retained in this position by radial spoke plates which are located in circumferentially spaced pairs extending from a central hub outwardly to the rims.

The "E-Z Trak" irrigation wheel has achieved some improvement over the older type of irrigation wheel, which simply had a steel banded single rim at the outer periphery thereof and which allowed the wheel to sink deeply into the earth and cause the rutting hereinbefore described. The "E-Z Trak" wheel accomplished some improvement in terms of resistance to rutting and sinking into damp earth. This occurred because the spaced, inwardly inclined rim plates tended to force or push the earth between the rims inwardly toward the central plane of the wheel, and to thus compact the earth in a way which supported the wheel better and prevented it from sinking deeply into the earth as a single rut was formed.

The "E-Z Trak" irrigation wheel, which is now patented as U.S. Pat. No. 5,046,785, though constituting an improvement over the simple single rim wheels of the past, has allowed undesirably large quantities of mud and earth to be impacted between the rim and the central hub of the wheel due to the flat, plate-like construction of the spokes, and the relatively close spacing of some of the spokes to each other. Moreover, the inclination of the rim plates by which they slope radially inwardly from the outer edge to the inner edge has been such that the earth has been forced inwardly into the center of the wheel, and from that location into the space between the rim plates and the central hub in greater quantities than would be desirable. The dirt and mud clogs the central portion of the irrigation wheel and causes it to become very bulky and heavy as a result of the accumulation of mud at this location. Such increase in weight aggravates he rutting problem.

An improved irrigation wheel which can be operated for longer periods of time is described in our co-pending U.S. patent application Ser. No. 07/649,971 filed on Feb. 14, 1991. That irrigation wheel includes a central hub plate which defines a central opening. The central hub plate is concentrically located with respect to the axis of rotation of the irrigation wheel, and is adapted to be drivingly connected to a gear box located at one of the irrigation system towers.

The central hub plate is concentrically surrounded by a pair of rim plates which are spaced from each other and from the central hub plate, and extend substantially parallel to each other. Each of the rim plates is in the shape of a frustum of a cone, thus having one of its peripheral edges (referred to the inner edge) located a closer radial distance to the axis of rotation of the wheel than its outer edge is located. Stated differently, each of the two rim plates slope radially inwardly slightly toward the central plane, with this inward slope being from the outer edge of the paired rim plates in the direction of the space which separates the rim plates. This configuration of the rim plates tends to compact the mud across which the wheel is moving, and to thus provide greater support to the irrigation wheel, thereby reducing the tendency of the wheel to sink downwardly in the mud and cause deep rutting.

The two rim plates are connected to the central hub plate by a plurality of bars or rods which form spokes maintaining the concentric relationship between the rim plates and the hub plate. The radially inner ends of these spoke rods or bars are secured to the hub plate, and the outer ends of the several spoke rods ar welded to transversely extending wheel lugs which are elongated plates extended across, and welded to the pair of rim plates. The wheel lugs occupy the axial space between the rim plates.

BRIEF DESCRIPTION OF THE PRESENT INVENTION

The present invention constitutes an improvement over the irrigation wheel described and depicted in my U.S. patent application Ser. No. 07/649,971 filed Feb. 4, 1991, and over the irrigation wheel disclosed in Bockerman U.S. Pat. No. 5,046,785. In general, the present invention is a lighter weight irrigation wheel than that described in my co-pending patent application, and it provides for reduced accumulation and impaction of dirt and mud in the wheel during operation of the irrigation system supported by the wheel. This reduction in mud accumulation and impaction is achieved primarily by the action of the dual rim which comes in contact with the earth as the wheel rolls across the earth, and the retention of an effective function for preventing the sinking of the wheel into the earth to cause deep rutting.

The principle structural change which allows an improvement to be realized in reducing earth accumulation and impaction, however, is the elimination of lug plates which, in the irrigation wheel disclosed and depicted in my co-pending U.S. patent application, and in Bockerman U.S. Pat. No. 5,046,785 extend transversely between the spaced paired dual rims of the wheel. I have found that these lug plates provide structural blocks between which mud can become impacted, and which have the effect of allowing an accumulation of mud which greatly increases the total weight of the irrigation wheel. The wheel of the present invention experiences much less build up of mud and earth in the center of the wheel and adjacent the dual rims of the wheel as mud passe between the spaced rims toward the hub of the wheel during operation of the irrigation system.

The irrigation wheel of the present invention includes a central, axially off-set hub plate which defines a central opening. The hub plate and opening are concentrically located with respect to the axis of rotation of the wheel. In a preferred embodiment, the central hub plate is circular. It is adapted to be drivingly connected to a gear box located at one of the irrigation system towers. The central hub plate is concentrically surrounded by a pair of spaced, circular rim plates which are spaced axially from each other, and are spaced radially outwardly, as well as axially, from the central hub plate.

The rim plates extend substantially parallel to each other, and each rim plate is in the shape of a frustum or cone. It thus has one of its annular peripheral edges (referred to as the inner edge) located radially closer to the axis of rotation of the wheel than is its outer edge located on the opposite side of the respective rim plate from the inner edge. Stated differently, each of the two rim plates slope radially inwardly toward the central plane which extends parallel to the rim plates, and normal to the axis of rotation of the irrigation wheel, with this radially inward slope being from the outer edge of each rim plate in the direction of the space which separates the rim plates. This configuration of the rim plates tends to compact the mud across which the wheel is moving, and to thus provide greater support to the irrigation wheel and reduce the tendency of the wheel to sink downwardly in the mud and cause deep rutting.

Each of the annular rim plates carries a plurality of internally positioned radially inwardly projecting, spoke anchoring plates. At the radially outer side of each rim plate, the rim plate carries a plurality of pairs of traction cleats which are substantially equally spaced from each other around the respective rim plate, but, as will be later discussed, the pairs on each rim are circumferentially offset or staggered from any pair on the opposite rim. Each traction cleat projects radially outwardly from the radially outer surface of the respective rim and functions to enhance traction of the irrigation wheel as it rotates to move the irrigation system across the ground.

Each of the two annular rim plates is connected to the central hub plate by a plurality of bars or rods which form spokes maintaining the concentric relationship between each rim plate and the hub plate. The spoke rods or bars are preferably arranged in transversely aligned pairs. The two rods in each pair form a U configuration. The radially inner end portion of each of these spoke rods or bars is bent at an obtuse angle to the outwardly extending leg, and the innermost end of each rod is secured by welding, or other suitable means, to a point located near the outer periphery of the hub plate. The outer ends of the several spoke rods are welded to one of the inwardly extending, circumferentially spaced, spoke anchor plates which are secured by welding, or other suitable means, to the inner side of each of the annular rim plates.

The angulation at which the two annular rim plates are inwardly sloped toward the central plane of the wheel, the spacing of the rim plates from each other and the configuration of the spokes and central hub plate, all function cooperatively to enable the irrigation wheel of the invention to move across soggy or moist earth without bogging or rutting of the wheel, while affording maximum support to the heavy irrigation pipe carried by the wheel. Moreover, the wheel will operate over extended periods of operation without becoming clogged or loaded with impacted mud which has been forced into the interior of the wheel and there retained. This is partially due to the fact that there are no impediments to mud flow inwardly between the rims and then back outwardly in an axial direction through the spokes so that it does not accumulate or jam up near the hub or interior of the wheel. The wheel itself is generally of lighter weight than similarly sized irrigation wheels as previously constructed, yet it is mechanically sturdy and is characterized in having a long and trouble free operating life.

An important object of the invention is to provide an irrigation wheel which is constructed so as to afford maximum support to both the wheel and the supported irrigation piping as the wheel traverses soggy or muddy earth.

A further object of the invention is to provide an irrigation wheel which supports an irrigation system traversing land to be irrigated without allowing the development of deep ruts as a result of the wheels sinking into the earth to a substantial depth.

A further object of the invention is to provide an irrigation wheel, which operates by confining muddy earth traversed by the wheel to a path centrally located with respect to the wheel, and which does not become clogged or caked with accumulated mud as a result of excessive migration of mud or dirt between the dual rims of the wheel and the interior of the wheel, and retention of the mud at that location by transversely extending lug plates or the like.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

FIG. 1 is a side elevation view of an irrigation wheel constructed in accordance with the present invention.

FIG. 2 is an end view of the irrigation wheel shown in FIG. 1.

FIG. 3 is a sectional view taken along line 3—3 of FIG. 1.

DETAILED DESCRIPTION OF A PREFERRED EMBODIMENT OF THE INVENTION

Referring initially to FIG. 1 of the drawings, an irrigation wheel is constructed in accordance with the present invention and includes a central hub plate 10 which is located at the center of the wheel, although it is offset axially toward one side of the wheel as will be apparent by reference to FIGS. 2 and 3. The hub plate 10 is preferably circular in configuration and has a generally circular opening 12 in the center thereof for accommodation of a drive element from a conventional gear box of the type used on center pivot irrigation systems. The opening 12 is symmetrically formed about the rotational axis of the irrigation wheel. A plurality of bolt holes 14 are disposed about the central opening 12 to permit the wheel to be bolted to the conventional gear box (not illustrated) used for imparting rotational movement force to the wheel in a manner well understood in the art.

Concentrically positioned in relation to the hub plate 10 and the axis of rotation of the irrigation wheel are a pair of annular rim plates shown in the drawing and there designated generally by reference numerals 16 and 18. In the illustrated embodiment of the invention, each of the annular rim plates 16 and 18 is shaped as a frustum of a cone and is arranged so that the outer edges of the respective rim plates, designated generally by reference numerals 16a and 18a respectively, are spaced radially outwardly by a greater distance from the rotational axis of the irrigation wheel than are the respective inner edges 16b and 18b of the respective rim plates. Each of the rim plates 16 and 18, in a preferred embodiment of the invention, is a steel plate having a width of from about 4 inches to about 10 inches, with about 6 inches being preferred. The thickness of each rim plate is about 3/16ths inch. The rim plates 16 and 18 extend substantially parallel to each other, and the axial spacing between the two rim plates, as measured across the space therebetween at the center of the wheel, is from about 8 inches to about 14 inches, with about 12 inches being preferred where each rim plate is about 6 inches in width.

In the illustrated embodiment of the invention, each rim plate 16 and 18 carries a plurality of radially inwardly extending spoke attachment plates 20 on the inner side of the respective rim plate, and a plurality of the radially outwardly extending mud cleat plates 22 on the radially outer side of the rim plates. Each of the radially inwardly extending spoke attachment plates 20 is of substantially trapezoidal configuration, as best illustrated in FIG. 3, and the radially outwardly extending mud cleat plates 22 are also trapezoidally configured. It will be perceived in referring to FIG. 3 that an annular reenforcement bar or rib 24 extends around and against the inner surface of each of the annular rim plates along the center line thereof. The bar or rib 24 extends through a central outer portion of each of the radially inwardly extending spoke attachment plates 20. As shown in FIG. 2, the radially outwardly extending mud cleat plates 22 are arranged on each of the annular rim plates 16 and 18 in pairs, and it will further be seen, as FIG. 2 is viewed, that each pair of mud cleat plates on one of the annular rim plates 16 or 18 is circumferentially offset or staggered with respect to any pair of such radially outwardly extending mud cleat plates on the other of the two rim plates.

For the purpose of interconnecting the central hub plate 10 with the axially spaced annular rim plates 16 and 18, a plurality of radially extending bars or rods of circular cross-section are provided and function as spokes. Thus, one set of spokes is denominated by reference numeral 26 and is provided for extension between the central hub plate 10 and one side of the annular rim plate 16. Each of the spokes 26 has a radially inner end portion which is bent through an obtuse angle with respect to the radially outer portion of the same spoke so that the inner end portion of each of these spokes extends substantially parallel to the axis of rotation of the irrigation wheel.

The inner end of each of the spokes 26 is secured by welding or other suitable means to one face of the central hub plate 10 at a location relatively near to the peripheral edge of the hub plate. A generally triangular gusset plate 28 is provided in association with the inner end portion of each of the spokes 26 by securement in the angle between the spoke and the hub plate 10. The gusset plate 28 functions to reenforce the mechanical connection made at this point between these two structural elements. At its outer end, each of the spokes 26 is welded or otherwise suitably secured to one of the radially inwardly extending spoke attachment plates 20, and also to the annular reenforcing rib 24.

It can be perceived when FIGS. 1 and 3 are viewed that the spokes 26, located at one side of the irrigation wheel and extending from one side of the central hub plate 10 to the rim plate 16, are located opposite a group or array of second spokes each denominated by reference numerals 30. One of these spokes 30 is aligned with one of the spokes 26, so that each pair of spokes 26 and 30 lies substantially in a single plane. In the case of the spokes 30, each of these spokes, like its counterpart spoke 26 on the opposite side of the wheel, has its radially inner end portion bent through an obtuse angle, with the inner end secured by welding or other suitable means to the central hub plate 10. The point of securement of each spoke 30 is directly across the central hub plate 10 from the point of securement of its counterpart spoke 26 located on the opposite side of the central hub plate. The radially outer end of each of the spokes 30 is secured by welding or other suitable means to one of the radially inwardly extending spoke attachment plates 20 and to the reenforcing rib or rod 24 carried on the rim plate 18.

As previously pointed out, the orientation of each of the rim plates 16 and 18 with respect to the rotational axis of the irrigation wheel is such that the inner peripheral edge of each rim plate is relatively nearer to the axis of rotation than is the outer peripheral edge of each rim plate. This causes each of the rim plates 16 and 18 to slope radially inwardly toward the main central plane of the irrigation wheel as is perhaps best illustrated in FIG. 3. When a rim plate about 6 inches wide is used, as in a preferred embodiment of the invention, the outside peripheral edge of the rim plate is located from about $\frac{1}{2}$ inch to about $\frac{7}{8}$th inch further from the axis of rotation of the irrigation wheel than is the inside peripheral edge of the respective rim plate.

In another way of describing the inclination which characterizes each of the rim plates 16 and 18 of the invention, the angle, α, is defined as the angle which lies between the plane of the respective rim plate, and a line drawn through one edge of the rim plate and parallel to the axis of rotation of the irrigation wheel (see FIG. 3). This angle will have a magnitude of between about 5° and about 10° in irrigation wheels constructed in accordance with a preferred embodiment of the present invention.

It is important to note that in the improved irrigation wheel of the present invention, the rim plates are interconnected to each other only by the spoke rods, and by the central hub structure to which the spoke rods are connected. In other words, the irrigation wheel is characterized as including an open annular space substantially devoid of any structural elements of the wheel, with this open annular space surrounding the hub plate and dimensioned to extend radially outwardly to a location of alignment with the rim plates. This open annular space is bounded on two opposed sides by the spokes in the two sets of spokes, and it is bounded centrally and radially inwardly by the hub plate and the bent end portions of the spokes. These end portions extend substantially parallel to the rotational axis of the wheel. The described structure allows mud and soft earth to pass freely and without impediment radially inwardly between the rim plates at all points around the wheel, after which the mud and soft earth can then pass freely axially between the spokes without becoming impacted or clogged in the wheel.

In the use of the irrigation wheel of the invention, the wheel is mounted to one of the two gear boxes located at each of the irrigation system towers. The two wheels at each tower support the pipe and interconnecting fitting structures, which move generally on a center pivot-type irrigation system. Irrigation wheels used along the length of the several pipes and system will, from time-to-time, be caused to rotate by connection to drive motors located at each of the towers and connected to the gear boxes, so that the pipes move in an arc or semi-circle around the center post. As the wheels move across the fields when changing the position of the irrigation system, they more often than not will encounter soil which has become muddy or wetted by the ongoing irrigation. There is therefore a marked propensity of the irrigation wheels to sink into the muddy soil and cause deep rutting in the fields.

The irrigation wheel of the present invention is less susceptible to impaction of mud and earth in and between the structural elements of the wheel, thereby causing rutting in the muddy earth traversed by the wheel. More particularly, the frustoconical rim plates, spaced openly from each other in an axial direction, by reason of their spacing and their relatively slight inclination, function effectively to force mud or impacted earth inwardly toward the center of the irrigation wheel, and then allow it to escape axially between the spokes of the wheel. The wheel provides more effective and trouble-free support to the irrigation system than other prior art irrigation wheels.

In addition to providing better support for the irrigation system by reason of the slight inclination of the transversely spaced rim plates 16 and 18, the rim plates in the irrigation wheel of the invention do not force large quantities of mud inwardly toward the center of the wheel at such a high rate that the mud builds up on the interior of the wheel after passing through the transverse space or gap between the two rim plates. This result is realized in an advantageous fashion because there are no lug plates or other structures disposed directly between the rim plates.

Although a preferred embodiment of the invention has been herein described in order to illustrate and explain the principles of the invention, various modifications and innovations can be effected in the illustrated and described structure without departure from the basic principles which underlie the invention. Changes and innovations of such character are therefore deemed to be circumscribed by the spirit and scope of the invention, except as the same may be necessarily limited by the appended claims, or reasonable equivalents thereof.

What is claimed is:

1. An irrigation wheel for supporting an irrigation system and for moving the system across muddy terrain comprising:

a central hub plate having a central opening therethrough and adapted to be mounted concentrically around the axis of rotation of the irrigation wheel;

a pair of spaced, substantially parallel, annular rim plates concentrically positioned around the axis of rotation of the wheel, the rim plates being spaced from each other along lines extending parallel to the axis of rotation of the wheel, and each of said rim plates having an outer peripheral edge lying in a first plane extending substantially normal to the axis of rotation of the wheel, and having an inner peripheral edge lying in a second plate extending substantially parallel to the first plane containing the outer peripheral edge, and said inner peripheral edges of said rim plates lying radially closer to said axis of rotation than said outer peripheral edges of said rim plates;

a plurality of generally L-shaped spoke rods connected between said central hub plate and each of said rim plates for collectively spacing said rim plates radially outwardly from the central hub plate, said L-shaped spoke rods each having a radially outer portion terminating in a radially outer end, and an inner end portion connected to said radially outer portion and defining therewith an obtuse angle, said inner end portion terminating in an inner end, said L-shaped spoke rods being arrayed in two groups located on opposite sides of said hub plate, each of said L-shaped spoke rods having its radially outer end connected to one of said rim plates, and having its inner end connected to said hub plate on one side thereof, said spoke rods being arranged in pairs so that each pair is in a substantially U-shaped array, and said rim plates being interconnected to each other only by said spoke rods and said central hub plates whereby mud and soft earth can pass freely radially inwardly between said rim plates at all points therearound, and can then pass freely axially between said spoke rods.

2. An irrigation wheel as defined in claim 1 wherein each of said rim plates is frustoconical in configuration, and is from about 4 inches to about 10 inches in width, and has its inner peripheral edge located about ½ inch to about ⅝ths inch closer to said axis of rotation of said irrigation wheel than is the outer peripheral edge thereof, and wherein said rim plates are spaced from about 8 inches to about 14 inches from each other.

3. An irrigation wheel as defined in claim 1 and further characterized as including a plurality of circumferentially spaced, radially inwardly extending spoke anchor plates projecting radially inwardly from the inner surface of said rim plates, each of said spoke rods having its outer end secured to one said radially inwardly projecting spoke anchor plates.

4. An irrigation wheel as defined in claim 1 and further characterized as including a plurality of mud cleat plates secured to the radially outer surface of said plates and projecting radially outwardly therefrom, said mud cleat plates being circumferentially spaced from each other around the periphery of each of said rim plates.

5. An irrigation wheel as defined in claim 3 and further characterized as including an annular reenforcement rib extending around the radially inner surface of each of said annular rim plates at the center thereof, and secured to the respective annular rim plate and to the spoke anchor plates projecting radially inwardly from the rim plate.

* * * * *

UNITED STATES PATENT AND TRADEMARK OFFICE
CERTIFICATE OF CORRECTION

PATENT NO. : 5,226,690
DATED : July 13, 1993
INVENTOR(S) : Goebel Clark et al

It is certified that error appears in the above-indentified patent and that said Letters Patent is hereby corrected as shown below:

Title Page:
Item [75] Inventors: Delete "Irwin E. Clark" and insert --Irvin E. Clark-- therefor.

Column 1, line 40, delete "on" and insert --one-- therefor.

Column 2, line 64, delete "ar" and insert --are-- therefor.

Column 3, line 33, delete "passe" and insert --passes-- therefor.

Column 8, line 56, delete "plates" and insert --plate-- therefor.

Signed and Sealed this

First Day of February, 1994

Attest:

BRUCE LEHMAN

*Attesting Officer*  *Commissioner of Patents and Trademarks*